United States Patent
Valdemarsson et al.

(10) Patent No.: US 10,837,822 B2
(45) Date of Patent: Nov. 17, 2020

(54) VEHICLE WEIGHING SCALE THAT DETERMINES WHEN THE WHEELS ENTER OR EXIT A SIDE BASED ON AN UNBALANCE CURRENT

(71) Applicant: MOTUS WEIGHING AB, Gothenburg (SE)

(72) Inventors: Stefan Valdemarsson, Lidköping (SE); Marcus Timmerman, Götene (SE)

(73) Assignee: MOTUS WEIGHING AB, Gothenburg (SE)

( * ) Notice: Subject to any disclaimer, the term of this patent is extended or adjusted under 35 U.S.C. 154(b) by 135 days.

(21) Appl. No.: 16/087,126

(22) PCT Filed: Mar. 21, 2017

(86) PCT No.: PCT/SE2017/050267
§ 371 (c)(1),
(2) Date: Sep. 21, 2018

(87) PCT Pub. No.: WO2017/164796
PCT Pub. Date: Sep. 28, 2017

(65) Prior Publication Data
US 2019/0107433 A1 Apr. 11, 2019

(30) Foreign Application Priority Data
Mar. 22, 2016 (SE) .................... 1650384-9

(51) Int. Cl.
*G01G 19/02* (2006.01)
*G01G 19/03* (2006.01)

(52) U.S. Cl.
CPC ........... *G01G 19/035* (2013.01); *G01G 19/02* (2013.01); *G01G 19/03* (2013.01)

(58) Field of Classification Search
CPC ....... G01G 19/02; G01G 19/03; G01G 19/035
See application file for complete search history.

(56) References Cited

U.S. PATENT DOCUMENTS 3,276,525 A * 10/1966 Cass ............... G01G 3/147
 177/1
3,474,875 A * 10/1969 Laimins ............ G01L 1/2225
 177/134

(Continued)

FOREIGN PATENT DOCUMENTS

CN   103674202 A   3/2014
CN   103994809 A   8/2014

(Continued)

OTHER PUBLICATIONS

International Search Report and Writtten Opinion dated Jun. 12, 2017 in corresponding international application No. PCT/SE2017/050267 (9 pages).

(Continued)

*Primary Examiner* — Randy W Gibson
(74) *Attorney, Agent, or Firm* — Venable LLP; Jeffri A. Kaminski

(57) ABSTRACT

The present invention relates to a method and a weighing scale for weighing vehicles, the weighing scale comprising a weighing bridge having a first and second side for entering and leaving the weighing bridge; a weighing circuit comprising a first set of load sensors and a second set of load sensors coupled to a weight indicator, the first set of load sensors being arranged at the first side and the second set of load sensors being arranged at the second side; a measuring circuit arranged to measure at least one unbalance current in the weighing circuit when a vehicle enters or leaves the weighing bridge; a processing circuit arranged to determine at least one point in time when wheels of the vehicle enter the first side or leave the second side based on the at least one unbalance current.

9 Claims, 6 Drawing Sheets

(56) References Cited

U.S. PATENT DOCUMENTS

| | | | | |
|---|---|---|---|---|
| 3,593,263 | A | * | 7/1971 | Olsen ........................ G01L 5/00 |
| | | | | 340/935 |
| 3,835,945 | A | * | 9/1974 | Yamanaka ........... G01G 19/024 |
| | | | | 177/134 |
| 4,049,069 | A | * | 9/1977 | Tamamura ........... G01G 19/024 |
| | | | | 177/134 |
| 4,492,280 | A | | 1/1985 | Susor |
| 5,585,604 | A | * | 12/1996 | Holm ................... G01G 19/035 |
| | | | | 177/133 |
| 6,137,066 | A | | 10/2000 | Waanelid |
| 6,459,050 | B1 | | 10/2002 | Muhs et al. |
| 2003/0168261 | A1 | | 9/2003 | Lund et al. |

FOREIGN PATENT DOCUMENTS

| | | |
|---|---|---|
| FI | 119829 B | 3/2009 |
| GB | 2178179 A | 2/1987 |

OTHER PUBLICATIONS

Chinese Office Action in corresponding Chinese Application No. 201780019441.8 dated Dec. 3, 2019 (8 pages).

* cited by examiner

200 

```
┌─────────────────────────────────────────┐
│                  202                    │
│ Measuring at least one unbalance current in the │
│ weighing circuit when a vehicle enters or leaves │
│          the weighing bridge            │
└─────────────────────────────────────────┘
                    │
                    ▼
┌─────────────────────────────────────────┐
│                  204                    │
│  Determining at least one point in time when │
│ wheels of the vehicle enter the first side or leave │
│  the second side based on the at least one │
│            unbalance current            │
└─────────────────────────────────────────┘
```

FIG. 2

VEHICLE WEIGHING SCALE THAT DETERMINES WHEN THE WHEELS ENTER OR EXIT A SIDE BASED ON AN UNBALANCE CURRENT

CROSS-REFERENCE TO RELATED APPLICATIONS

This application is a U.S. National Stage application of PCT/SE2017/050267, filed Mar. 21, 2017 and published on Sep. 28, 2017 as WO 2017/164796, which claims the benefit of Swedish Patent Application No. 1650384-9, filed Mar. 22, 2016, all of which are hereby incorporated by reference in their entireties.

TECHNICAL FIELD

The present invention relates to weighing scales for weighing vehicles. Furthermore, the present invention also relates to a corresponding method.

BACKGROUND

Road vehicles or railway vehicles are typically weighed to determine that the weight does not exceed limitations set by regulators, such as maximum vehicle total weight or maximum vehicle axle load on roads, railroads or bridges. Another typical application is to determine the cargo weight of the loaded vehicle. A first group of conventional systems comprise weighing scales with relatively short weighing bridge, i.e. shorter than the wheelbase of the vehicle. These systems typically have a weighing bridge with a length of <1 m, shorter than the typical distance between axles ($\approx$1.3 m) of a bogie of a common vehicle such as lorry and/or a truck, and monitor or weigh the weight of one axle at a time. The weight of each individual axle and the total weight of the vehicle can then be determined by weighing multiple times and combining the results. A problem with these scales is the bad accuracy, where the error at the best conditions may be in the range of ±1% on average and at worse conditions as high as ±8%.

A second group of conventional systems comprise weighing scales with a relatively long weighing bridge, i.e. longer than or equal to the wheelbase of the vehicle, where more than one vehicle axle may be on the weighing bridge simultaneously. For these scales, when used as weigh in motion scales, there is a problem of finding the correct weight of each individual axle and the total weight of the vehicle. This further presents the problem of how to determine different points in time when wheels of a first axel and/or a second axle enters the first side of the weighing bridge or leaves the second side of the weighing bridge. This is particularly difficult when the wheelbase of the vehicle substantially matches the length of the weighing bridge such that points in time when the vehicle axles enters/leaves the weighing bridge occur closely in time. A further difficulty arises when the axel weights are substantially the same. Conventional systems have difficulties to separate the different axle load weighing states, in particular to determine a reliable point in time when wheels of a vehicle enter a first side of the weighing bridge or leave the second side of the weighing bridge.

U.S. Pat. No. 6,459,050 B1 shows a conventional apparatus and method for converting in-ground static weighing scales, with a relatively long weighing bridge, for vehicles. The apparatus upon conversion includes the existing in-ground static scale, peripheral switches and an electronic module for automatic computation of the weight. By monitoring the velocity, tire position, axle spacing, and real time output from existing static scales as a vehicle drives over the scales, the system determines when an axle of a vehicle is on the scale at a point in time.

A disadvantage of conventional systems is that they require additional complex components such as tape switches, cameras, radars or other position/speed sensing systems, thereby increasing the probability for failure and reducing robustness.

SUMMARY

An objective of embodiments of the present invention is to provide a solution which mitigates or solves the drawbacks and problems of conventional solutions.

A further objective of embodiments of the present invention is to provide an improved solution for determining at least one point in time when wheels of a vehicle enter a weighing bridge or leave the weighing bridge.

The above and further objectives are solved by the subject matter of the independent claims. Further advantageous implementation forms of the present invention can be found in the dependent claims.

According to a first aspect of the invention, the above mentioned and other objectives are achieved with a weighing scale for weighing vehicles, the weighing scale comprising: a weighing bridge having a first side being an entering side for a vehicle entering the weighing bridge and a second side being a leaving side for a vehicle leaving the weighing bridge; a weighing circuit comprising a first set of load sensors and a second set of load sensors coupled to a weight indicator, the first set of load sensors being arranged at the first side and the second set of load sensors being arranged at the second side; a measuring circuit arranged to measure at least one unbalance current in the weighing circuit when a vehicle enters or leaves the weighing bridge; a processing circuit arranged to determine at least one point in time when wheels of the vehicle enter the first side or leave the second side based on the at least one unbalance current.

An advantage of the weighing scale according to the first aspect is that a point in time, when wheels of a vehicle enter a first side of the weighing bridge or leave the second side of the weighing bridge, can be determined with improved reliability and for any combination of wheelbase and weighing bridge length. A further advantage is that an improved accuracy can be achieved by using a relatively long weighing bridge and weight signals from existing load sensors, thus enabling conversion of existing in-ground static weighing scales to dynamic weighing. A further advantage is low cost and low complexity and increased robustness as no extra equipment, such as tape switches, cameras, radars or other position/speed sensing systems are required.

In a first possible implementation form of a weighing scale according to the first aspect, the measuring circuit comprises at least one measurement resistance for each set of load sensors, wherein each measurement resistance is coupled between its set of load sensors and the weight indicator.

An advantage of this implementation form is that it is simple and robust. Yet an advantage of this implementation form is that varying sensitivity of the load sensors can be compensated for and thereby reduce the sensitivity to the position of the vehicle on the weighing bridge.

In a second possible implementation form of a weighing scale according to the first implementation form of the first aspect, each measurement resistance has a resistance value in the interval between 0.1 to 100 Ohm.

An advantage of this implementation form is that the introduction of resistances does not significantly influence the weight signal.

In a third possible implementation form of a weighing scale according to the first aspect, the measuring circuit comprises at least one measurement transformer coupled between each set of load sensors and the weight indicator.

In one example, the magnetic core material of the measurement transformer is a nanocrystalline material, an amorphous material or any other high magnetic material with high initial permeability.

An advantage of this implementation form is that the weighing circuit and the measurement circuit operate without galvanic connection.

In a fourth possible implementation form of a weighing scale according to any of the preceding implementation forms of the first aspect or the first aspect as such, the processing circuit is arranged to determine the point in time based on at least one first unbalance current at the first set of load sensors and/or at least one second unbalance current at the second set of load sensors. Therefore, the processing circuit is arranged to determine the point in time based on the first unbalance current at the first set of load sensors, or based on the second unbalance current at the second set of load sensors, or the first unbalance current at the first set of load sensors and the second unbalance current at the second set of load sensors.

An advantage of this implementation form is that the accuracy of the at least one point in time is improved. Another advantage of this implementation form is that the point in time can be determined for both driving directions, i.e. both for a vehicle entering the weighing bridge on the first side and leaving the weighing bridge on the second side and for a vehicle entering the weighing bridge on the second side and leaving the weighing bridge on the first side.

In a fifth possible implementation form of a weighing scale according to any of the preceding implementation forms of the first aspect or the first aspect as such, the processing circuit is arranged to determine if the point in time relates to whether the wheels of the vehicle enter the first side or leave the second side based on at least one weight signal associated with the at least one unbalance current.

In a sixth possible implementation form of a weighing scale according to the fifth implementation form of the first aspect, the processing circuit is arranged to determine if the point in time relates to whether the wheels of the vehicle enter the first side or leave the second side based on at least one derivative of the at least one weight signal.

An advantage of this implementation form is that the detection accuracy of when an axle enters or leaves the weighing bridge is improved.

In a sixth possible implementation form of a weighing scale according to any of the preceding implementation forms of the first aspect or the first aspect as such, the processing circuit is arranged to determine at least one of an axle weight of the vehicle and a total weight of the vehicle based on, or by using the determined at least one point in time when wheels of the vehicle enter the first side or leave the second side.

According to a second aspect of the invention, the above mentioned and other objectives are achieved with a method at a weighing scale, the weighing scale comprise at least one weighing bridge having a first side being an entering side for a vehicle entering the weighing bridge and a second side being a leaving side for a vehicle leaving the weighing bridge, a weighing circuit comprising at least one first set of load sensors and at least one second set of load sensors coupled to a weight indicator, the first set of load sensors being arranged at the first side and the second set of load sensors being arranged at the second side; the method comprising:

measuring at least one unbalance current in the weighing circuit when a vehicle enters or leaves the weighing bridge, and determining at least one point in time when wheels of the vehicle enter the first side or leave the second side based on the at least one unbalance current.

In a first possible implementation form of a method according to the second aspect, the method comprises determining the at least one point in time based on at least one first unbalance current at the first set of load sensors and at least one second unbalance current at the second set of load sensors.

In a second possible implementation form of a method according to the first implementation form of the second aspect or the second aspect as such, the method comprises determining if the point in time relates to whether the wheels of the vehicle enter the first side or leave the second side based on at least one weight signal associated with the at least one unbalance current.

In a third possible implementation form of a method according to the second implementation form of the second aspect, the method comprises determining if the point in time relates to whether the wheels of the vehicle enter the first side or leave the second side based on at least one derivative of the weight signal.

The advantages of the methods according to the second aspect are the same as those for the corresponding device claims according to the first aspect.

Further applications and advantages of the present invention will be apparent from the following detailed description.

BRIEF DESCRIPTION OF THE DRAWINGS

The appended drawings are intended to clarify and explain different embodiments of the present invention, in which:

FIG. 2 shows a method at a weighing scale, in accordance with one or more embodiments of the invention.

DETAILED DESCRIPTION

The present invention relates to a weighing scale and a method at a weighing scale. The invention may be particularly relevant for high accuracy vehicle weigh-in-motion scales, such as Low Speed Weigh-In-Motion LSWIM (5-10 km/h) scales and/or Medium Speed Weigh-In-Motion MSWIM (10-60 km/h) scales. Furthermore, the present invention relates to new or existing static scales designed for weight measurement where the vehicle is stationary during weighing which, by applying the present solution, can be converted for use in dynamic vehicle weighing.

As mentioned previously, the first group of conventional systems comprise weighing scales with relatively short weighing bridge and therefore suffering from low accuracy. The low accuracy is due to poor averaging of the oscillating weight, redistribution of load between bogie axles during travel and redistribution of load between axles during the travel caused by, for example change in pulling/pushing forces.

Figure 1:
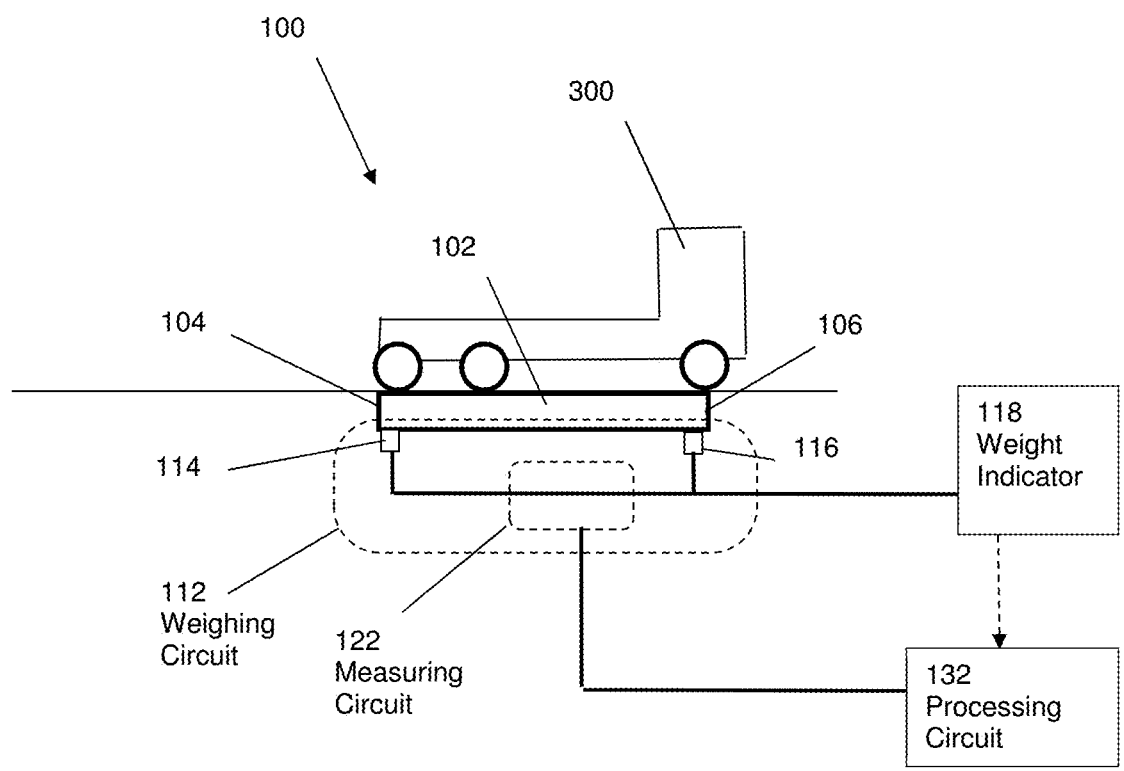
FIG. 1 shows a weighing scale for weighing vehicles, in accordance with one or more embodiments of the invention.

FIG. 1 shows a weighing scale 100 for weighing vehicles, in accordance with one or more embodiments of the invention. The weighing scale 100 comprises a weighing bridge 102 having a first side 104 being an entering side for a vehicle 300 entering the weighing bridge 102 and a second side 106 being a leaving side for the vehicle 300 leaving the weighing bridge 102. The weighing scale 100 further comprises a weighing circuit 112 comprising a first set of load sensors 114 and a second set of load sensors 116 coupled to a weight indicator 118, the first set of load sensors 114 being arranged at the first side 104 of the weighing bridge 102 and the second set of load sensors 116 being arranged at the second side 106 of the weighing bridge 102. In one example, the vehicle 300 passes over the weighing bridge 102 from the first side 104 to the second side 106 and weight signals are generated by the first and second set of load sensors 114, 116 and passed to the weight indicator 118 that indicates the loads applied by the vehicle 300 on the weighing bridge 102.

The weighing scale 100 further comprises a measuring circuit 122 arranged to measure at least one unbalance current i (not illustrated in FIG. 1) in the weighing circuit 112 when a vehicle 300 enters or leaves the weighing bridge 102. In one example, the first and second set of load sensors 114, 116 generate a first and second set of weight signals. The unbalance current i in the weighing circuit 112 may be measured, e.g. based on the first and second set of weight signals. An advantage of this is that by introducing the measuring circuit 122, an existing static vehicle scale can be converted to a weigh-in-motion scale whilst keeping the old weight indicator 118. The scale with the weight indicator 118 and the first and second set of load sensors 114, 116, that may have passed type approval tests, remain unchanged and in operation, meaning that no further complementary type approval for the static scale is required after the conversion.

The weighing scale 100 further comprises a processing circuit 132 arranged to determine at least one point in time T when wheels of the vehicle 300 enter the first side 104 or leave the second side 106 based on the at least one unbalance current i. The processing circuit 132 may be coupled to the measuring circuit 122 and optionally to the weight indicator 118. The processing circuit 132, based for instance on a micro-controller, may further process the weight data from the weight indicator 118 in digital form, thus needing no precision A/D-converter of its own. The processing circuit 132, may further comprise a non-precision A/D-converter and be configured to processes the weight data from the weight indicator 118 in analog form. In one example, the processing circuit 132 is contained in a separate enclosure or cabinet, and is placed nearby the weight indicator 118, e.g. at a distance less than 3 m.

FIG. 2 shows a method at a weighing scale 100, in accordance with one or more embodiments of the invention. The weighing scale 100 comprises at least one weighing bridge 102 having a first side 104 being an entering side for a vehicle 300 entering the weighing bridge 102 and a second side 106 being a leaving side for a vehicle 300 leaving the weighing bridge 102, a weighing circuit 112 comprising at least one first set of load sensors 114 and at least one second set of load sensors 116 coupled to a weight indicator 118, the first set of load sensors 114 being arranged at the first side 104 and the second set of load sensors 116 being arranged at the second side 106. The method 200 comprises: measuring 202 at least one unbalance current i in the weighing circuit 112 when the vehicle 300 enters or leaves the weighing bridge 102, and determining 204 at least one point in time T when wheels of the vehicle 300 enter the first side 104 or leave the second side 106 based on the at least one unbalance current i.

In one or more embodiments of the invention, each load sensor, e.g. a Wheatstone bridge, may comprise four load sensor resistors that are balanced such that when the load sensor is excited with a voltage EXC+, EXC− a weight signal amplitude of substantially 0 Volt is obtained from an output port SIG+, SIG−. When the load sensor is subjected to load, a weight signal amplitude proportional to the load is obtained from the output port SIG+, SIG−.

In an example, where a first set of load sensors are subjected to axle load F and a second and a third set of load sensors are not subjected to load, circulating currents or unbalance currents will flow from the first set of load sensors to the second and third set of load sensors. The first set of load sensors may be arranged at the first side of the weighing bridge, the third set of load sensors may be arranged in the middle of the weighing bridge and the second set of load sensors may be arranged at the second side of the weighing bridge. These unbalance currents i may flow through the load sensor resistors, e.g. of a Wheatstone bridge. If for simplicity an ideal case is assumed where load sensor resistors of the Wheatstone bridges all are equal and no load is applied, all load sensors are in balance, thus there is no voltage difference between the respective output ports SIG1+, SIG2+, SIG3+, and therefore the unbalance current is zero, i.e. i=0. When an axel force F is applied, as described above, and all the positive and negative output ports, respectively, are connected in parallel to form a total signal output port (SIG+, SIG−), a voltage appears across the first output port (SIG3+, SIG−) thereby driving the unbalance current i towards the second 116 and the third set 115 of load sensors, where the current i is divided into i/2 for each set of load sensors, as further described in relation to FIG. 6.

The total weight signal (SIG+)−(SIG−) from the total signal output port may be described by the following relation:

$$(SIG+)-(SIG-)=\tfrac{1}{3}*U*\Delta R/R(F),$$

where U=supply voltage (EXC+)−(EXC−) fed to each load sensor, e.g. 10 V, where $\Delta R/R(F)$ is a load sensor relation as a function of the load force F representing the relative change of resistance in the first set of load sensors which are subjected to the load F.

In an example, where two load sensors are placed on the first side 104, the relation $\Delta R/R(F)$ may be defined as:

$$\Delta R/R(F)=F/(2*F\text{nom})*KL/1000,$$

where KL is the load sensor sensitivity in mV/V, e.g. 2 mV/V, and where Fnom is the nominal load of each load sensor, e.g. 100 000 N.

The maximum total signal value can now be calculated as:

$$\Delta R/R(200000)=200000/(2*100000)*2/1000=0,002 =>$$
$$(SIG+)-(SIG-)=\tfrac{1}{3}*10*0.002=0.0067\ V.$$

The unbalance current generated at the first set of load sensors (those who are subjected to the axle load F) may be calculated as:

$$i=2*\tfrac{2}{3}*U/R*\Delta R/R(F).$$

Assuming the same numerical values as above and with a load cell resistor value R=350 ohm the unbalance current at nominal load applied at the first set of load sensors can be calculated as:

$$i=2*\tfrac{2}{3}*10/350*0.002=76 \text{ micro Ampere}.$$

The unbalance current, measured at the first set of load sensors, will thus vary between 76 and −76/2=−38 micro Ampere when the single axel load force F=2*Fnom moves along the weighing bridge.

Figure 6:
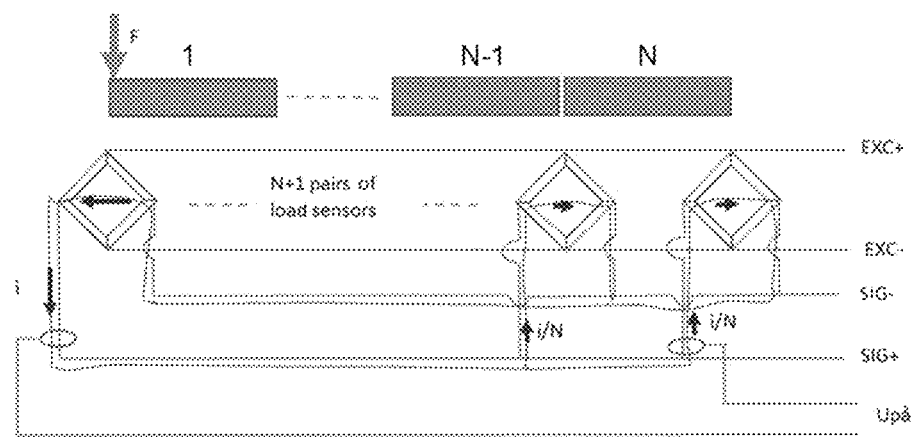
FIG. 6 shows how unbalance currents flow in a weighing scale with multiple weighing platforms, in accordance with yet another embodiment of the invention.

When a single axle moves onto the first side 104 of the weighing bridge, the unbalance current i, measured at the first set of load sensors as described in FIG. 6, will start with a positive steep slope from a zero value and reach a peak value i_peak. During the movement of the axle from the first side 104 to the second side 106 the magnitude of the unbalance current i slowly decreases from the positive value i_peak to a negative value i_peak/N. When the axle moves off the weighing bridge, the unbalance current i measured at the first set of load sensors, will again have a positive steep slope and finally approach zero value. The steep slopes are essential to determine at least one point in time when wheels of the vehicle 300 enter the first side 104 or leave the second side 106 based on the at least one unbalance current i.

Figure 3:
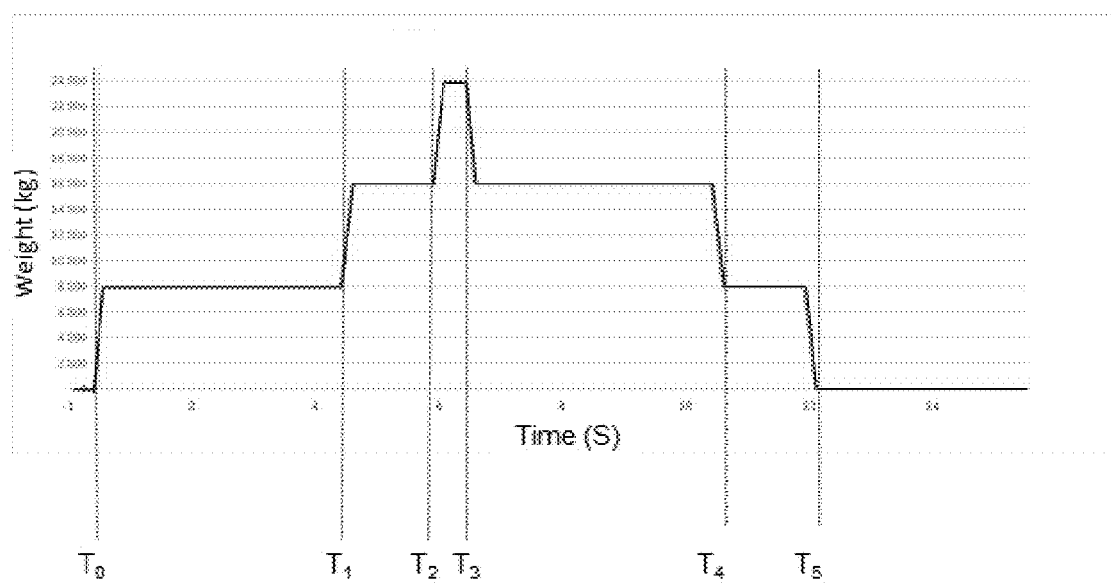
FIG. 3 shows a diagram of a weight signal comprising points in time when wheels of the vehicle enter the first side or leave the second side based on the at least one unbalance current according to an embodiment of the invention.

FIG. 3 shows a diagram of the total weight signal ((SIG+)−(SIG−)) comprising points in time when wheels of the vehicle enter the first side or leave the second side. In the example shown in FIG. 3, the vehicle may have three axles. At a point in time T0, the wheels of the first axle enter the weighing bridge. In a similar manner, at points T1 and T2, the wheels of the second and third axle, respectively, enter the weighing bridge. At a point in time T3, the wheels of the first axle leave the weighing bridge. In a similar manner, at points T4 and T5, the wheels of the second and third axle, respectively, leave the weighing bridge. When performing dynamic weighing of vehicles with a weighing bridge long enough to allow at least two of the vehicles axles to simultaneously be on the weighing bridge it is essential that the points in time when wheels on an axle of the vehicle 300 enter the first side 104 or leave the second side 106 can be determined in a correct and reliable manner. This might, at first sight, seem obvious to achieve by monitoring the derivative of the total weight signals of FIG. 3 and determine the point in time on when the derivative changes. In the present example, the weighing bridge is longer than the wheelbase of the vehicle, thereby making it relatively easy to make clear distinction between the point in time T2 and the point in time T3. However, when the wheelbase of the vehicle is equal to the length of the weighing bridge T2 and T3 coincide, it may be difficult to make clear distinction between the point in time T2 and the point in time T3. The present invention solves this by determining at least one point in time when wheels of the vehicle enter the first side or leave the second side based on the unbalance current i, and in particular based on the combination of the unbalance current i and derivative(s) of the weight signal.

When the wheels of an axle enter the weighing bridge, the unbalance current i generated by the first set of load sensors 114 increases with a steep positive slope (derivative). When all the wheels of all the axels are on the weighing bridge and the vehicle is moving forward, the unbalance current i starts to decrease slowly and finally becomes negative when the vehicle is approaching the end of the weighing bridge. When wheels of an axle begin to leave the weighing bridge, the sensor signal in the form of the unbalance current i generated at the second set of load sensors 116 increase with a steep positive slope (derivative). Hence, a steep positive slope indicates either "axle entering scale" or "axle leaving scale". The slopes are easily detectable as the signal slope in the middle part, when the vehicle is moving along weighing scale, is relatively flat. In the case of entering from the second side 106 all the steep slopes will in similar manner have the opposite sign. Hence the slope sign of the sensor signal in the form of the unbalance current i will be an indicator of vehicle moving direction.

Figure 4:
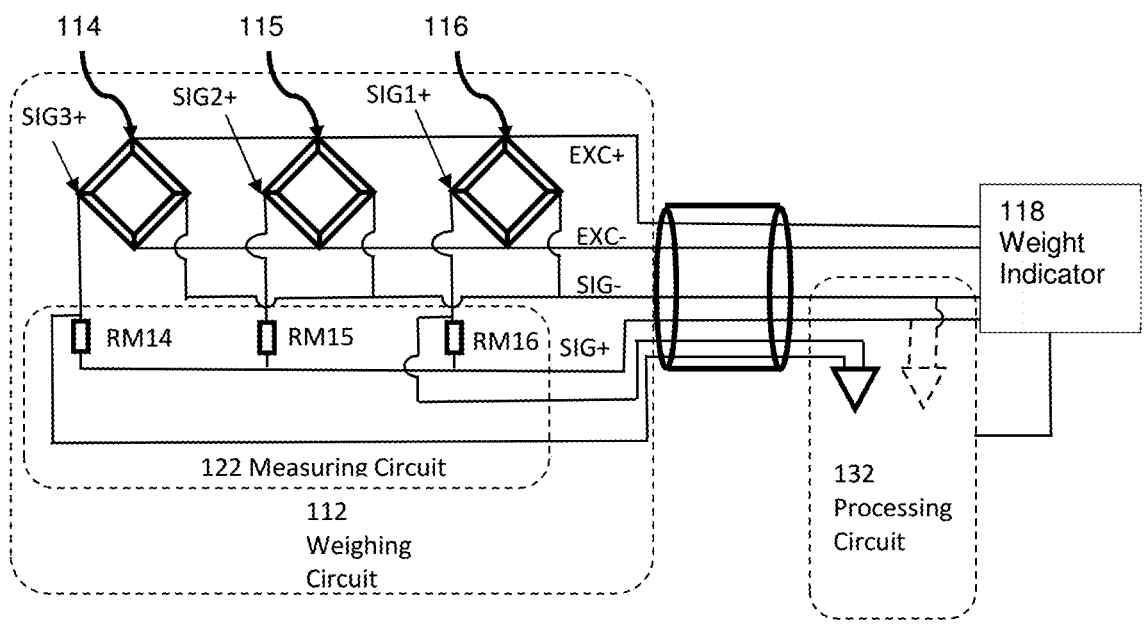
FIG. 4 shows an electronic schematic of a weighing scale, in accordance with an embodiment of the invention.

FIG. 4 shows an electronic schematic of the weighing scale 100, in accordance with an embodiment of the invention. The measuring circuit 122 may further comprise at least one measurement resistance RM for the first set of load sensors 114 and the second set of load sensors 116, where each measurement resistance is coupled between its respective set of load sensors 114, 116 and the weight indicator 118. In one example, shown in FIG. 4, the weighing circuit 112 comprises a first set of load sensors 114, a second set of load sensors 116 and a third set of load sensors 115. Each set of load sensors has an output port, SIG1+, SIG2+ and SIG3+, and are each connected via a respective measurement resistance RM14-16. All the measurement resistances RM14-16 may have the same value but may also be adapted for tuning the scale factors of each set of load sensors in order to eliminate the deviations in the presented weight data, e.g. when a fixed mass is weighed on the scale at different positions along the weighing bridge in the direction of travel of the vehicle.

In an embodiment, each measurement resistor RM14-16 is selected in the span of 1-10% of the resistance of load sensor resistors in the load sensor, such as a Wheatstone bridge, e.g. in the range of 1-50 Ohm or in the range of 0.1-100 Ohm. It can be theoretically shown, in the case of constant load on the scale, that the signal level of SIG+ and SIG− are unaffected when varying the measurement resistor values from zero to at least 50 Ohm, under the condition that all measurement resistors respectively all load sensor resistors have the equal resistor value, i.e. RM14=RM15=RM16. In other words, the introduction of the summing resistors does not give any noticeable deviation in the weighing data presented at the weight indicator 118. The measuring circuit 122 may further comprise a junction box (not shown) where the first set of load sensors 114, the second set of load sensors 116 and the weight indicator 118 are connected. The connection to the weight indicator 118 may be in the form of a shielded cable. The load sensors may be arranged at the corners of the weighing bridge 102. When the measurement resistors RM14-16 are comprised in or introduced into the measuring circuit 122, the unbalance current will change and may be represented by the modified relation:

$$I=2*\tfrac{2}{3}*U/R*\Delta R/R(F)/(1+2*RM/R),$$

In yet an embodiment, an unbalance voltage signal Upa may be derived as:

$$Upa=RM14*i+RM16*i/2=(SIG3+)-(SIG1+).$$

Upa is in other words a voltage signal reflecting in a symmetrical way the behaviour of the unbalance current i and is valid for both direction of travel over the weigh bridge. Upa will thus have positive steep slopes for one direction and negative steep slopes for the other direction. The signal Upa may be combined with the weight signal (SIG+)−(SIG−) and used as a base for creating the final axle position sensing signals needed. In order to determine the individual axle weights and the total weight in an accurate manner, two axle position sensing signals are needed, one (hereafter named Pks) for axles entering the scale on the leading edge/first side 104 and one (hereafter named Aks) for axles leaving the scale at the trailing edge/second side 106. These two signals need to be independent of each other in a sense that Pks may never indicate when axles are leaving the scale and Aks may never indicate when axles are entering the scale. The final axle position sensing signal Pks may, e.g. be derived from the weight signal (SIG+)−(SIG−) and the unbalance voltage signal Upa by adding them together in such a proportion P that the resulting Pks becomes zero towards the end when the axle leaves the weigh bridge. The proportion P is set by the choice of amplification in both hardware and software. To achieve identical values for the weight signal and the Pks at the moment of axle entrance the signals may be added in the following way:

$$Pks=((SIG+)-(SIG-)+P*Upa)/2.$$

The Aks signal is simply derived by subtracting Pks from weight signal, i.e.

$$Aks=\text{Weight}-Pks=((SIG+)-(SIG-)-P*Upa)/2.$$

The presented method thus creates two independent axle position sensing signals, Pks and Aks, one with steep positive slopes and one with steep negative slopes when the axles enter respectively leave the weigh bridge.

A drawback with the embodiment comprising measurement resistances is that the measurement resistances RM are in galvanic connection with the load sensors 114, 116. This requires that the electronic circuits needed to evaluate the unbalance signal Upa fulfil the same requirements as the existing components of the weighing scale, e.g. with respect to Electromagnetic Compatibility (EMC). It may also have implications on the validity of the existing static scale type approval, depending on national or international requirements and regulations. There is a risk that the solution described in relation to FIG. 4 demands a complementary type approval procedure for the static scale function. This drawback is addressed by the solution described below in relation to FIG. 5.

Figure 5:
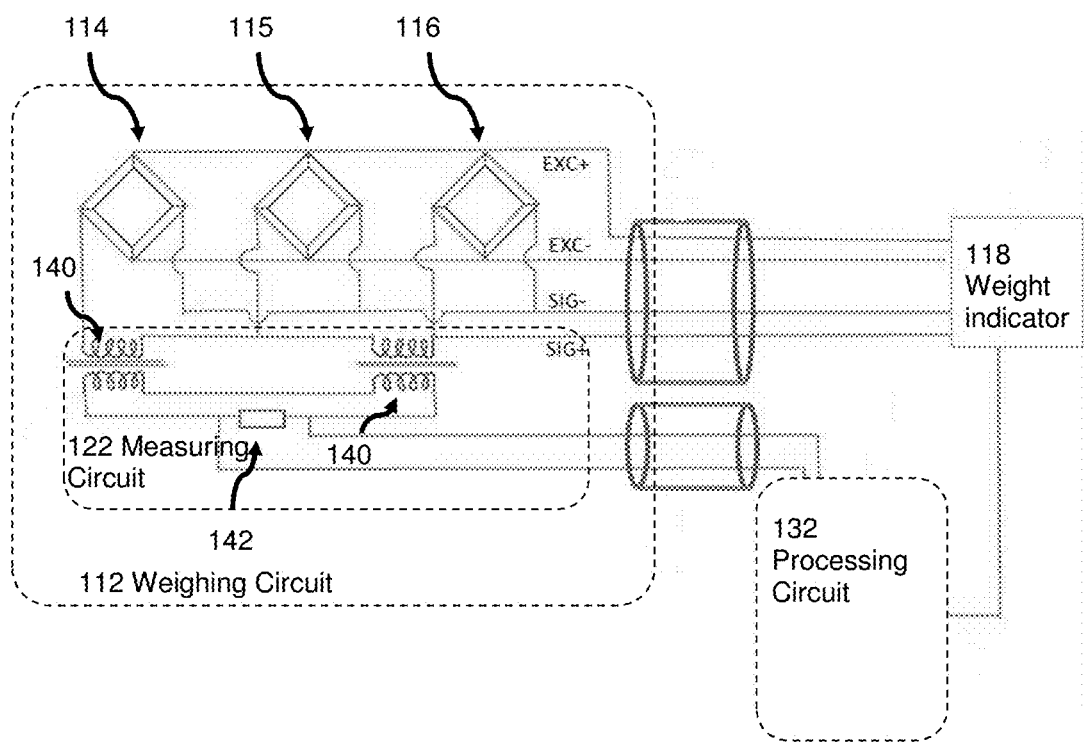
FIG. 5 shows an electronic schematic of a weighing scale, in accordance with yet an embodiment of the invention.

FIG. 5 shows an electronic schematic of the weighing scale 100, in accordance with yet an embodiment of the invention. The measuring circuit 122 may comprise at least one measurement transformer 140 coupled between each set of load sensors 114, 116 and the weight indicator 118. The measuring circuit 122 is arranged to measure at least one unbalance current i in the weighing circuit 112 when a vehicle 300 enters or leaves the weighing bridge 102 by monitoring the current of the secondary winding of the at least one measurement transformer 140. The advantage of this embodiment is that there will be no galvanic connections between the secondary side of the measuring circuit 122 and the set of load sensors 114, 116.

In one example, the measurement transformer is provided with three windings on one single core. When the axles of the vehicle drive over the leading edge of the weigh bridge a positive pulse (corresponding to Upa) will be created and each time an axle leaves at the trailing edge a positive pulse (corresponding to Upa) appears over the secondary winding of the transformer. The impedance of the primary winding can be made less than 1 ohm and thereby its influence on load sensors 114, 116 is negligible, especially this is true if the same overall impedance is introduced in all connection points to the Wheatstone bridge of all sets of load sensors. The advantage of this embodiment is that requirements on components may be relatively low, as the precision of the weighing result depends substantially only on the accuracy of the load sensors 114, 115, 116 and the weight indicator 118.

In one embodiment, a first measurement transformer is arranged to measure the unbalance current at the first set of load sensors and a second measurement transformer is arranged to measure the unbalance current at the second set of load sensors.

In yet an embodiment, the measuring circuit 122 further comprises a transformer resistance 142 coupled to a secondary winding of the first measurement transformer and the secondary winding of the second measurement transformer.

In yet an embodiment, a single measurement transformer is configured with a first and a second primary winding and arranged to measure the unbalance current at the first set of load sensors by the first primary winding and to measure the unbalance current at the second set of load sensors by the second primary winding. The windings of the measurement transformer and the transformer resistance 142 are selected such that the equivalent resistance on the primary side is negligible, e.g. less than 0.5 Ohm.

FIG. 6 shows how unbalance currents flow in a weighing scale with multiple weighing platforms, in accordance with yet another embodiment of the invention. In an example, the weighing scale 100 comprises a weighing bridge 102 comprising N platforms, each with a corresponding set of load sensors, e.g. N+1 sets of load sensors. The load sensors may be located at the corners of each platform. In the joint between two adjacent platforms only one set of load sensors may be used. Each load sensor may be a Wheatstone bridge to which a supply voltage EXC+, EXC− is fed. When no load is applied, all load sensors are in balance, thus there is no voltage difference between the respective output ports, and therefore the unbalance current i is zero, i.e. i=0. When an axel force F is applied on the entering side and the output ports are connected in parallel to form a total signal output port (SIG+, SIG−), a voltage appears across the first output port thereby driving the unbalance current i towards the other N sets of load sensors, where the unbalance current i is divided into i/N for each set of load sensors. FIG. 6 further describes how an unbalance current signal Upa is derived based on the unbalance currents. The means of measuring the unbalance current can, besides the examples already described, be for example Hall sensors, optical current measuring devices, Rogowski coils, or any other appropriate means or methods available for measuring currents.

The one or more points in time when wheels of the vehicle 300 enter the first side 104 or leave the second side 106 determined according to the present invention may be used for determining at least one axle weight of the vehicle 300 and/or the total weight of the vehicle 300. In one example, the points in time are used for discarding sections or samples of the weight signal since by considering such sections and/or samples will lead to incorrect determination of the axle weight and total weight. Hence, the processing circuit 132 is in this case arranged to discard sections or samples of a weight signal based on at least one point in time when wheels of the vehicle 300 enter the first side 104 or leave the second side 106. Further, the processing circuit 132 is in this case also arranged to determine the axle weight and/or the total weight based on non-discarded sections or non-discarded samples of the weight signal. In one example, the non-discarded sections or non-discarded samples are averaged so as to determine the axle weight and/or the total weight.

Finally, it should be understood that the present invention is not limited to the embodiments described above, but also relates to and incorporates all embodiments within the scope of the appended independent claims.

The invention claimed is:

1. Weighing scale for weighing vehicles, the weighing scale comprising:
a weighing bridge having a first side being an entering side for a vehicle entering the weighing bridge and a second side being a leaving side for a vehicle leaving the weighing bridge;
a weighing circuit comprising a first set of load sensors and a second set of load sensors coupled to a weight indicator, the first set of load sensors being arranged at the first side and the second set of load sensors being arranged at the second side;
a measuring circuit arranged to measure at least one unbalance current in the weighing circuit when a vehicle enters or leaves the weighing bridge;
a processing circuit arranged to determine at least one point in time when wheels of the vehicle enter the first side or leave the second side based on the at least one unbalance current, wherein the at least one unbalance current is at least one first unbalance current at the first set of load sensors and/or at least one second unbalance current at the second set of load sensors.

2. Weighing scale according to claim 1, wherein the measuring circuit comprises at least one measurement resistance for each set of load sensors, wherein each measurement resistance is coupled between its set of load sensors and the weight indicator.

3. Weighing scale according to claim 2, wherein each measurement resistance has a resistance value in the interval between 0.1 to 100 Ohm.

4. Weighing scale according to claim 1, wherein the measuring circuit comprises at least one measurement transformer coupled between each set of load sensors and the weight indicator.

5. Weighing scale according to claim 1, wherein the processing circuit is arranged to determine if the point in time relates to whether the wheels of the vehicle enter the first side or leave the second side based on at least one weight signal associated with the at least one unbalance current.

6. Weighing scale according to claim 5, wherein the processing circuit is arranged to determine if the point in time relates to whether the wheels of the vehicle enter the first side or leave the second side based on at least one derivative of the at least one weight signal.

7. Method at a weighing scale, the weighing scale comprising at least one weighing bridge having a first side being an entering side for a vehicle entering the weighing bridge and a second side being a leaving side for a vehicle leaving the weighing bridge, a weighing circuit comprising at least one first set of load sensors and at least one second set of load sensors coupled to a weight indicator, the first set of load sensors being arranged at the first side and the second set of load sensors being arranged at the second side; the method comprising:
measuring at least one unbalance current in the weighing circuit when a vehicle enters or leaves the weighing bridge, and
determining at least one point in time when wheels of the vehicle enter the first side or leave the second side based on the at least one unbalance current, wherein the at least one unbalance current is at least one first unbalance current at the first set of load sensors and/or at least one second unbalance current at the second set of load sensors.

8. Method according to claim 7, the method comprises determining if the point in time relates to whether the wheels of the vehicle enter the first side or leave the second side based on at least one weight signal associated with the at least one unbalance current.

9. Method according to claim 8, the method comprises determining if the point in time relates to whether the wheels of the vehicle enter the first side or leave the second side based at least one derivative of the at least one weight signal.

* * * * *